June 16, 1964   A. W. SWENSON   3,137,085
FISHING LURE
Filed July 26, 1961
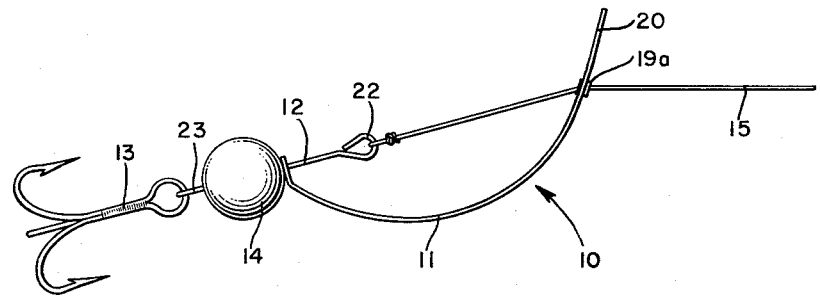
FIG. 1.
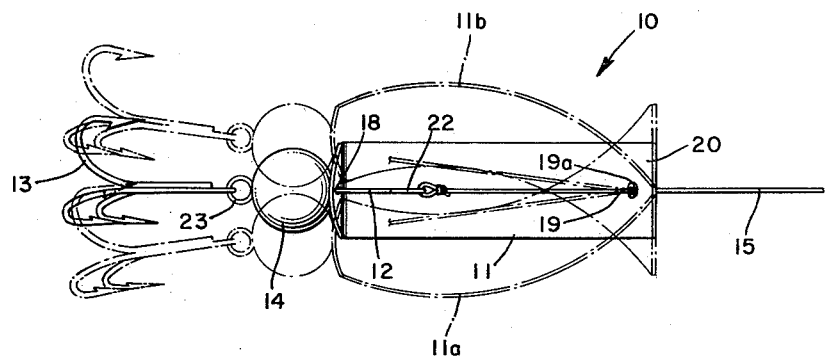
FIG. 2.
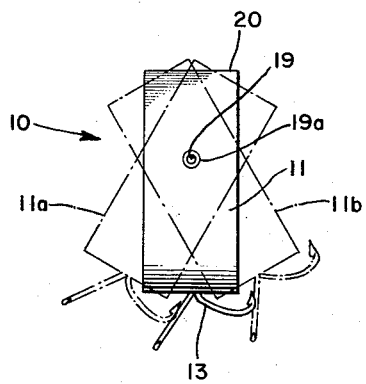
FIG. 3.
ARTHUR W. SWENSON
INVENTOR.
ATTORNEYS.

United States Patent Office 3,137,085
Patented June 16, 1964

3,137,085
FISHING LURE
Arthur W. Swenson, 24979 Walnut St., Newhall, Calif.
Filed July 26, 1961, Ser. No. 126,905
4 Claims. (Cl. 43—42.36)

This invention relates to fishing lures and more particularly to a unique and improved lure having a minimum number of components and so constructed and arranged that a single unitary arcuate member is acted upon by the water to impart a lively movement to the fishing hook by compound movement of the lure through two principal paths of movement.

Many proposals have been made respecting fishing bait and lure devices intended to entice fish to grasp a barbed hook. The present invention relates to lures designed for fishing by trolling. Lures of this type conventionally incorporate provision for imparting movement of some nature to one or more parts of the lure thereby to enliven the same and attract the attention of fish. Although these have met with varying degrees of success, all are subject to certain disadvantages and are only partially effective for their intended purposes.

By the present invention there is provided an unusually simple lure construction found to provide results superior to prior lures. Essentially, the lure comprises a wide elongated strip of metal bent into an arc and provided medially of its length with a pair of small openings one of which is located closely adjacent the trailing end of the strip. The second opening is spaced rearwardly of the leading end of the strip. A short link of stiff wire provided with loops at its opposite ends is mounted loosely in the first opening and has its inner end connected to the end of the fishing line which passes loosely through the opening near the leading end of the strip. A fishing hook of desired construction is coupled to the eyelet loop at the trailing end of the link and a sphere of plastic or the like lightweight material is loosely mounted about the shank of the link between its two loops.

In use and while the lure is being propelled through the water it is found that the described lure construction tends to assume a rearwardly inclined position lying at an angle to adjacent portions of the fish line. It is further found that the lure construction together with the action of the water on the curved portion of the arcuate strip imparts a lively compound movement to the fishing hook with the lure causing swinging through a short arc to either side of the path of travel about a pivot point at the leading end of the lure. At the same time, the arcuate strip tends to oscillate through a second path about the axis of its two holes and to either side of the line of travel. For reasons not fully understood, this lively movement imparted to the hook is unusually effective in attracting the fish and assuring a strike which results in the capture of fish. Under normal conditions of use, the lure of this invention never spins or rotates about the line.

Accordingly, it is a primary object of the present invention to provide a new, improved simplified and highly effective fishing lure.

Another object of the invention is the provision of an improved fishing lure utilizing an arcuate strip of flat metal pivotally mounted on the end of a fishing line in such manner as to impart a to-and-fro lateral swinging movement of the hook and of the lure as a whole as the arcuate strip itself oscillates to-and-fro about an axis inclined downwardly from the axis of portions of the fish line immediately forward thereof.

These and other more specific objects will appear upon reading the following specification and claims and upon considering in connection therewith the attached drawing to which they relate.

Referring now to the drawing in which a preferred embodiment of the invention is illustrated.

FIGURE 1 is a side view of the fish lure according to the present invention as normally positioned while being pulled through the water and with the parts thereof occupying an intermediate position;

FIGURE 2 is a top plan view of the lure shown in FIGURE 1 and additionally including dot-and-dash line showings of typical positions of the lure to either side of the central position illustrated in full line; and FIGURE 3 is an end view from the right hand end of FIGURE 2 and indicating aspects of the lure movement.

Referring to FIGURES 1 to 3, there is shown a preferred embodiment of a fishing lure designated generally 10 and incorporating the principles of the present invention. Essentially, the lure comprises an arcuate strip of thin metal 11, a double-ended eyelet link 12, and a suitable fishing hook 13. Additionally and desirably, the shank of link 12 has a sphere or the like member 14 loosely mounted thereon and cooperating with strip 11 for various purposes including the support of strip 11 at a suitable effective angle with respect to the axis of the fish line proper 15.

Arcuate strip 11 is an important component of the lure and is found highly effective when constructed in the proportions generally illustrated in the drawings. The thickness and weight of this strip are found to be of considerable importance, a thickness gauge of 20 to 30 mils being found suitable and particularly effective results being obtained with a thickness of 24 to 25 mils. The arcuate strip is provided with a pair of openings along its median center line, a first opening 18 being located closely adjacent the trailing end of the strip and a second similar opening 19 being provided rearwardly of the leading end. An eyelet 19a is preferably mounted in opening 19 to safeguard against rough edges and any possibility of cutting the line. Of importance is the fact that opening 19 is located approximately one-fifth to one-sixth the distance from the leading to the trailing end of the strip. When so positioned, the upper end 20 of the strip tends to lie in a generally vertical plane above opening 19 under normal trolling conditions and serves as a stabilizer tending to maintain the strip in the position illustrated in FIGURE 1.

The exact explanation of the results achieved by the use of the extension 20 is not known with certainty but it is believed that the action of the water on the forward face of extension 20 cooperates with and counteracts the action of the water on the forward face of the strip below opening 19 with the result that the lure is supported in the inclined position shown. This inclined position is represented by the acute angle between a line drawn through openings 18 and 19 and a horizontal line passing through opening 19. As will be readily appreciated, the rounded surface of the arcuate strip together with their differently related positions in the water with respect to the path movement constitutes a position of unstable equilibrium which will be discussed more fully presently together with the effects resulting therefrom.

Of importance is the fact that the rear end of fish line 15 itself passes loosely through eyelet 19a and is secured to the inner or forward loop 22 of link 12. The shank of this link, as pointed out above, passes loosely through opening 18 and through a similar large opening extending diametrically of plastic sphere 14. The outer loop 23 of link 12 is coupled directly to the loop on the shank of fish hook 13. The described arrangement is found to provide highly superior results and assures friction-free swinging or oscillatory movement of strip 11 about the line and the shank of link 12. It is also pointed out that ball 14 provides an anti-friction support for the lower end of strip 11 and contributes materially to the ease with which the strip oscillates in use. The ball also facilitates relative pivotal movement between link 12 and strip 11.

In use, the described lure is trolled through the water in the usual manner. Some fishermen prefer to bait the barbs of hook 13 while others find that the lure is highly effective in capturing fish without need for baiting. As the lure is pulled through the water at medium slow speed, the lure device as a whole tends to have two principal movements which cooperate in imparting a highly effective lively action to the hook itself. This compound movement is not easily illustrated. In general, however, it will be understood that the action of the water on the forward face of stabilizing extension 20 above opening 19 tends to pivot strip 11 counterclockwise about the center of the arc until the portions acting on extension 20 are substantially counterbalanced by the forces acting on the forward surface of the strip below opening 19 and tending to pivot the strip clockwise. At this time, the lure is in an unstable condition of equilibrium with the result that the slightest unbalance sets the lure into motion. The lure then tends to swing through two different principal paths.

A first movement comprises a to-and-fro sidewise oscillatory movement of strip 11 about an axis passing through openings 18 and 19. Typical extreme positions of this oscillatory movement are illustrated by the dotted line showings of the strip designated respectively by 11a and 11b in FIGURES 2 and 3. Simultaneously, with this described to-and-fro oscillatory movement, it is found that the lure as a whole, including hook 13, swings to-and-fro about a pivot point provided by the passage of line 15 through opening 19 of strip 11. Additionally, it is found that there is a tendency of strip 11 to oscillate through a third short path about the focal point of the arc of curvature of strip 11, that is, a center point located above the center of strip 11 as viewed in FIGURE 1. A particular function performed by the double loop link 12 and ball 14 is not fully understood but it is known that its omission from the lure detracts in a marked way from the described and highly effective lively action of the hook and of the associated components of the lure.

While the particular fishing lure herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A nonrotating fishing lure constructed and arranged to be energized to provide lively movement of a fishing hook as the lure is pulled through a body of water at the end of a line, said lure comprising a single thin wide flat strip of rigid material formed into an arc lengthwise thereof and having a leading end and a trailing end at its opposite ends, said arcuate strip having a small opening through its trailing end and a second opening near its leading end at a point spaced rearwardly a substantial distance from its leading end, the portion of said leading end in advance of said second opening providing a stabilizing extension projecting generally vertically above said last-mentioned opening when the lure is being pulled through the water, elongated double-ended wire link means having the midportion thereof loosely mounted through said first-mentioned opening, fish hook means coupled to the outer trailing end of said link, and a fish line extending rearwardly through said second opening and secured to the inner leading end of said link, whereby upon being pulled through the water by said line the water acts on said arcuate strip to oscillate said arcuate strip to and fro in an arc to either lateral side to the path of travel of the lure and simultaneously to swing said hook and the trailing end of said strip about a pivot point provided by the passage of the fish line through the opening near the leading end of said arcuate strip.

2. A fishing lure as defined in claim 1 characterized in the provision of a small spacer member supported loosely along the outer trailing end of said wire link means exteriorly of the trailing end of said arcuate strip.

3. A fishing lure as defined in claim 1 characterized in the provision of a sphere having a diameter somewhat less than the length of the midportion of said link means and mounted loosely thereon exteriorly of the trailing end of said arcuate strip.

4. A fishing lure constructed and arranged to provide a compound oscillating and pivotal movement about the free submerged end of a fishing line as the lure is pulled along under water thereby to provide gentle lively movement to fish hook means carried by said lure, said fishing lure comprising: a single long flat strip of metal arched lengthwise thereof and having a trailing end and a leading end, said leading end having an opening therethrough spaced approximately one-fifth the length of said strip from the tip of said leading end thereby to provide a stabilizing fin adapted to project upwardly at an acute angle to the vertical as the lure is pulled through the water from the free end of a fishing line, a second opening through the trailing end of said strip, a link of straight wire loosely mounted in said second opening and having a sphere loosely mounted thereabout on the exterior side of said strip of metal and rearward of the trailing end of said strip, said wire link having loop eyelets formed at the opposite ends thereof, fish hook means loosely assembled to the loop eyelet remote from the leading end of said strip, a fishing line having its free end threaded through said first opening at the leading end of said strip and tied to the loop eyelet of said wire link closest to the leading end of said strip and overlying the downwardly arched midportion of said strip, the leading end of said strip being freely journaled on said fishing line and the trailing end thereof being freely journaled on the mid-length portion of said wire link with the midportion of said strip lying suspended below the anchorage of the free end of said fishing line with the last mentioned one of said loop eyelets, said arched strip being free to oscillate to and fro about an axis passing through the two openings in said strip, and the oscillations of said strip being effective to impart bodily to-and-fro pivotal movement to said lure as a whole about a pivot point in the immediate vicinity of the opening through the leading end of said strip as the lure is pulled through the water from the leading end thereof.

References Cited in the file of this patent

UNITED STATES PATENTS

| 1,273,425 | Tuttle | July 23, 1918 |
| 2,290,433 | Jeffers | July 21, 1942 |
| 2,375,290 | Docteur | May 8, 1945 |
| 2,522,179 | Jensen et al. | Sept. 12, 1950 |
| 2,593,027 | Heino | Apr. 15, 1952 |
| 2,619,757 | Freire | Dec. 2, 1952 |
| 2,711,049 | Quyle | June 21, 1955 |
| 2,774,171 | Pulver | Dec. 18, 1956 |
| 2,820,316 | Wille | Jan. 21, 1958 |
| 2,950,560 | Worden | Aug. 30, 1960 |